INVENTORS
LORIS L. GERBER
KARL H. MIDDENDORF
BY
Alfred R. Fuchs
ATTORNEY

Nov. 9, 1965   L. L. GERBER ETAL   3,216,162
BEARING MEMBERS FOR PRESTRESSED CONCRETE ANCHORAGES
Filed May 26, 1960   6 Sheets-Sheet 2

INVENTORS
LORIS L. GERBER
KARL H. MIDDENDORF
BY
Alfred R. Fuchs
ATTORNEY

Nov. 9, 1965   L. L. GERBER ETAL   3,216,162
BEARING MEMBERS FOR PRESTRESSED CONCRETE ANCHORAGES
Filed May 26, 1960   6 Sheets-Sheet 4

INVENTORS
LORIS L. GERBER
KARL H. MIDDENDORF
BY Alfred R. Fuchs
ATTORNEY

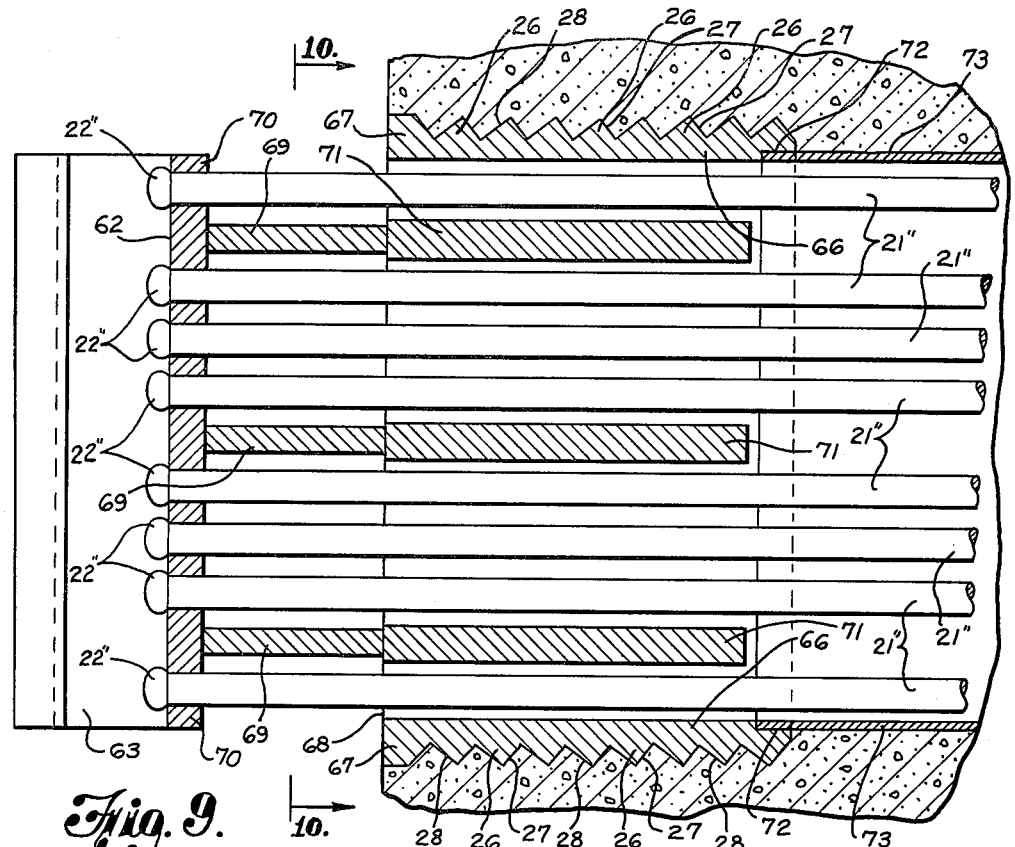
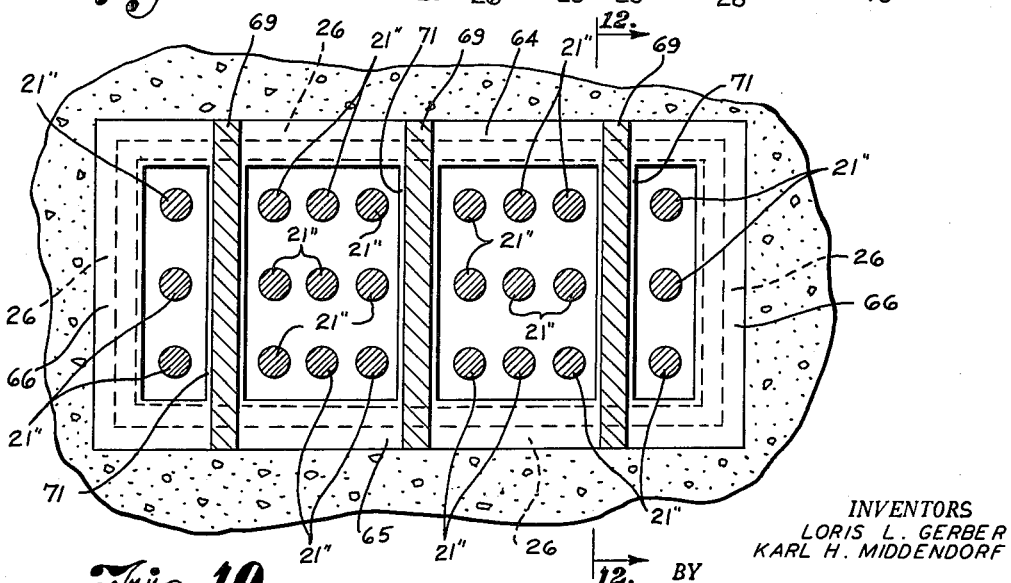

INVENTOR.
LORIS L. GERBER
KARL H. MIDDENDORF
BY Alfred R. Fuchs
ATTORNEY 3,216,162
BEARING MEMBERS FOR PRESTRESSED
CONCRETE ANCHORAGES
Loris L. Gerber, Englewood, Colo., and Karl H. Middendorf, Costa Mesa, Calif., assignors to The Prescon Corporation, a corporation of Texas
Filed May 26, 1960, Ser. No. 31,933
9 Claims. (Cl. 52—230)

Our invention relates to bearing means for anchorages in prestressed concrete structures, and more particularly to anchoring means for tension members in post-tensioned concrete structures having bearing means embedded in the concrete.

In post-tensioned prestressed concrete it has been the normal practice to provide relatively heavy or thick flat bearing plates embedded in the concrete positioned perpendicularly to the direction of length of the tension members to transfer the thrust of the prestressing elements to the concrete. This practice has involved certain difficulties, particularly in concrete structures in which the cross section thereof and the position of the plates, relative to the external faces of the concrete structure extending substantially perpendicularly thereto, have placed the marginal portions of the plates close to these external surfaces. This has resulted in the concentration of bearing stresses near the outside faces of the concrete structure, which induces excessive undesirable stresses beyond the bearing area because the bearing area encroaches on the edges of the structural member. This often results in cracking and spalling off of the concrete at the locations where these undesirable stresses are concentrated. Furthermore, in many cases where it is necessary to utilize a plate-like bearing member of the above referred to character of such proportions that it has its marginal edges located so that the bearing area encroaches on the edges of the structural member in this manner, there is also insufficient fire or other protection for the metal because of the fact that there is insufficient thickness of concrete between the exposed surfaces of the structural member and said metal structure.

It is a purpose of our invention to provide means for reducing the bearing area of a bearing member for an anchorage in post-tensioned prestressed concrete structures at or near the surface of the structural member, but to provide means whereby the necessary bearing surface is created by means that provides a predetermined cumulative bearing in depth into the concrete, thus reducing adjacent surface stresses in the structure and adding protective thickness of concrete due to the fact that the bearing area in a single plane, which would have to be unduly large and have the above referred to objections, is replaced by a plurality of bearing areas located in different planes and at different spacings from the anchored end of the tension members that are utilized for prestressing the structural member.

These objects are obtained by what we here refer to as an angulated bearing member, which is provided with a plurality of angularly related faces that are located so that they are longitudinally adjacent with respect to the tension members and the length of bearing members, the length of the bearing member being generally in the direction of length of the tension members. Said bearing means elongated longitudinally of the tension members is provided with thrust distributing surfaces on the exterior thereof extending obliquely to the direction in which the tension members extend.

More specifically our invention provides for the distribution of the thrust by means of ribs on the bearing means, which ribs have the length thereof extending crosswise to the direction of extent of the tension members and thus crosswise of the bearing means, which is elongated longitudinally of the tension members, so as to extend a considerable distance into the concrete structure from the external end thereof, said ribs being preferably V-shaped in character and being all of the same cross section so that all of the thrust distributing surfaces of each of said bearing means extend at the same oblique angle to the direction of extent of the tension members, and so that each of said thrust distributing surfaces or faces of said ribs is of the same width. Furthermore, said ribs are preferably uniformly spaced from each other so that the areas put under compression by each thereof under the action of the tension members will be the same and will be equally distributed in the direction of length of the tension members at the anchored ends of the concrete structure.

Said bearing means can take various forms, dependent upon what type of anchorage is to be used therewith, and what type of structure is to have the prestressing means applied thereto. In order to provide bearing means that is particularly adaptable for use in concrete structures of thin cross section, such as floor slabs, and avoid the difficulties encountered with bearing plates such as have been previously utilized adjacent the surface of the marginal portion of the slab, which often brings the edge of the bearing plate too close to the surface to comply with restrictions relative to the coverage of the concrete for fire proofing or other purposes, and so close as to cause spalling of the corner portion of the slab due to the stresses exerted on the portion thereof beyond the edge of the plate, said bearing means can be made in the form of plates that extend in length parallel to the direction of length of the tension member and have the wide faces thereof provided with the above referred to thrust distributing means. This type of bearing member also has the advantage that the elongation beyond economic proportions of the hereinbefore mentioned plate-like bearing members, extending perpendicularly to the direction of extent of the tension members, is avoided. By providing bearing means that produces directed stresses in the concrete, a uniform bearing is obtained, or in other words, the compression in the areas surrounding the bearing means is uniform due to the action of the bearing surfaces provided on our improved bearing member.

Preferably such a bearing member is made up of a pair of plate-like members that are held in position in engagement with opposite sides of a plurality of tension members by suitable fastening means securing said plate-like members in such gripping engagement with the tension members that the tension members can be pulled through the same in stressing the tension members. The ribs are provided on said plate-like members in such a manner that the plate-like members can be extruded in the direction of length of the ribs and cut into proper length for the number of wires or strands that are to be associated therewith.

Our invention can also be applied to the post-tensioning methods, wherein groups of tensioning elements are collectively stressed through anchorage of the stressing elements in a single stressing member, commonly called a stressing washer or stresser. Anchorage of the stressing elements in the stresser may be through heading of the wires or conical gripping devices. There are two types of this post-tensioning method. In the first type the stresser is small enough in external dimension to move freely longitudinally in relation to the bearing member. In the second type the stresser is larger in external dimension than the interior of the bearing member and normally is temporarily affixed to the bearing member. In such case the bearing means is preferably made in a tubular form with the ribs provided on the outer cylindrical surface thereof and arranged in adjacency axially of the tubular member, the stresses created by the tension members being transferred to the outer end surface of the tubular member by suitable means interposed between the anchor and the stressing member. This type of bearing member can also be utilized in connection with other stressers of this general character, in which headed or gripped wires are associated with the anchor member and the anchor member is held in its stressed position by means of shims interposed between the end faces of the tubular member and the anchor member. Such tubular anchor members may be either circular in cross section or of a rectangular character, such a rectangular tubular member being provided, on the etxernal faces thereof, with the rib structure for distributing the thrust.

Instead of providing a cylindrical bearing member, our invention is also adaptable for application to a bearing member that is of a frusto-conical character for particular use in installations where single wires or stranded wires are retained by means of a frictional wedging thereof in position, and in such a bearing member it is desirable and is a purpose of our invention to provide means for properly positioning the single wires or stranded wires in relation to each other by means of grooves which may be provided on the inner surface of such a conical member and which also serve to provide a more positive anchorage for such stranded wire members.

While in the structures that are illustrated in the drawings the angulated bearing ribs are shown as being normal to the line of stressing force, this is not absolutely necessary, although a preferred position. It would be possible under special conditions to have the ribs related to each other in other patterns as long as the same are parallel to each other.

Other objects and advantages of our invention will appear as the description of the drawings proceeds. We desire to have it understood, however, that we do not intend to limit ourselves to the particular details shown or described, except as defined in the claims.

In the drawings:

FIG. 9 is a horizontal sectional view through an anchorage in which a tubular bearing member of rectangular cross section is provided for anchoring a plurality of laterally adjacent vertical rows of tensioning members, showing a fragmentary portion of the concrete in which the bearing member is embedded.

FIG. 10 is a section taken on the line 10—10 of FIG. 9.

Figure 1:
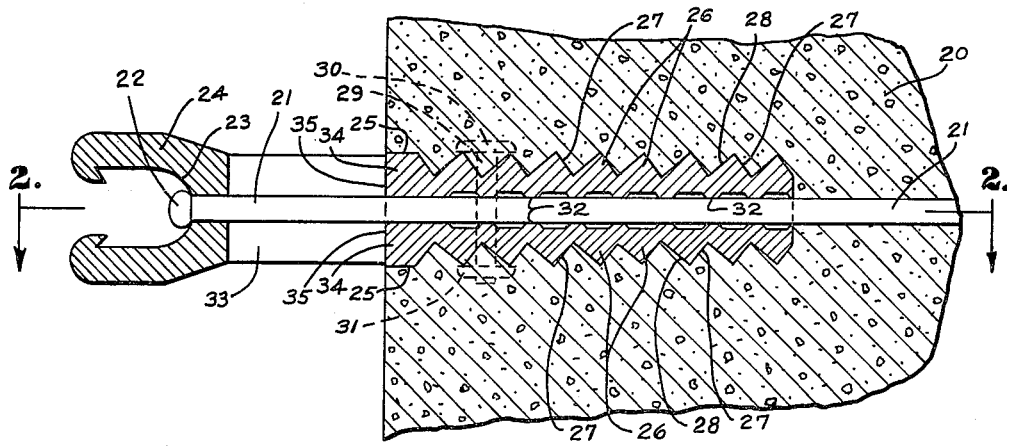
FIG. 1 is a fragmentary vertical sectional view through a concrete structure in which one of our bearing members is mounted, the particular bearing member shown in FIG. 1 being adapted for thin structures, such as floor slabs.
Figure 2:
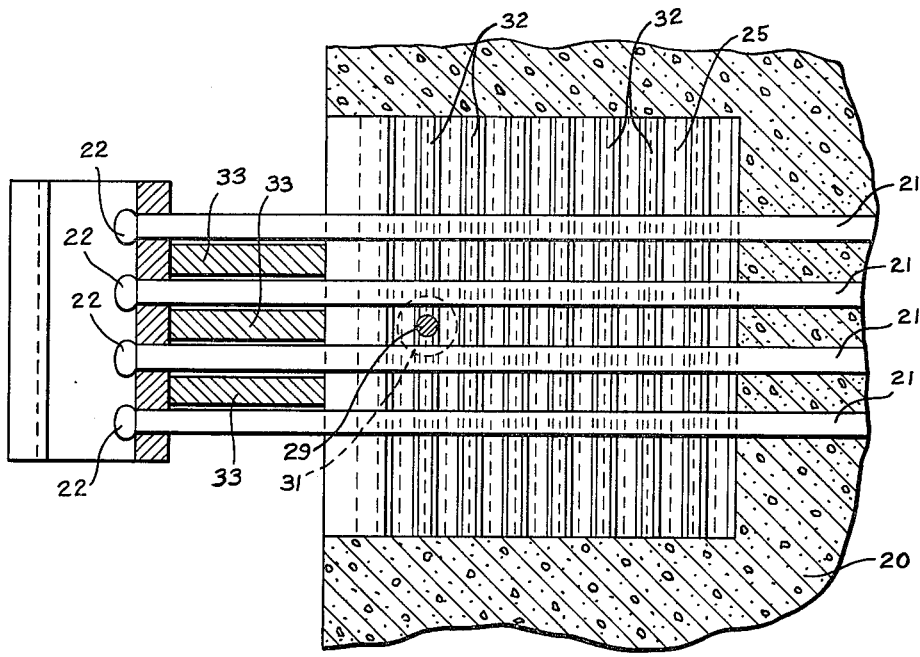
FIG. 2 is a section taken on the line 2—2 of FIG. 1.

Referring in detail to the drawings, in FIG. 1 is shown a body of concrete 20, which may be relatively thin, such as a floor slab, for example, in which a plurality of tension members 21 is provided. The tension members shown are provided with heads 22, which are seated against a wall 23 of an anchor member 24 and which is shown in the position that it assumes when the tension members 21 have already been stressed. Mounted on the opposite sides, such as the upper and lower sides, of the members 21, in the case of a floor slab, is a pair of plates 25. The plates are preferably duplicates and are interchangeable. Each of said plates is provided with a plurality of V-shaped ribs 26 on one of the faces thereof, said ribs being provided on the faces of said plate that will be outermost or away from the tension members, when the plates are assembled in the position shown in FIGS. 1 and 2 on said tension members. Each of said ribs has a thrust distributing surface 27 and an oppositely inclined surface 28 extending to the next adjacent thrust distributing surface.

Said ribs 26 are preferably all of the same cross sectional shape and are arranged in parallel relationship and uniformly spaced. As will be obvious, the plates 25 are elongated in the direction of length of the tension members 21, and it will be obvious that said plates can be of any desired extent, for the proper anchorage of the tension members, lengthwise thereof and crosswise thereof, the extent of the anchor plates 25 crosswise of the tension members being determined by the number of tension members that are associated with the anchor member that is part of the anchorage in which the bearing means is included. All of the faces 27 of the bearing means extend at the same oblique angle to the length of the tension members 21 and are so directed that the compression exerted on the concrete by the stressing of the tension members through said surfaces 27 will be acting at an oblique angle outwardly away from the tension members in an upward and downward direction, in the case of a floor slab, for example, thus distributing the compression over a considerable depth in a direction that is such that the area under compression gradually widens outwardly away from the tension members 21 toward the upper and lower surfaces of such a member as a floor slab and in a direction away from the end edge of the structural member, such as a floor slab.

In order to hold the plates 25 in assembled relation on the tension members 21 during the positioning of the same in the form and the pouring of the concrete, headed fastening elements, such as the headed element 29, which preferably has a head 30 of a flat character, and which is provided with a relatively flat nut 31 having threaded engagement with the fastening element 29, are provided, which clamp the plate-like members in position on the tension members. In order to provide proper spacing but still retain a good grip on the tension members for the plates 25, ribs 32 are provided on those faces of the plates that are adjacent the tension members 21. Said ribs 32, when pressed into engagement with the tension members 21, however, do not grip these tightly enough that the same can not be moved longitudinally of themselves through the pair of plates 25 when sufficient tension for stressing is applied thereto by the stressing means. In order to provide a good bearing surface for the shims 33 against the end faces of the plates 25, thickened portions 34 are provided on said plates running along said edges and having flat bearing surfaces 35 against which the shims 33 bear.

Figure 3:
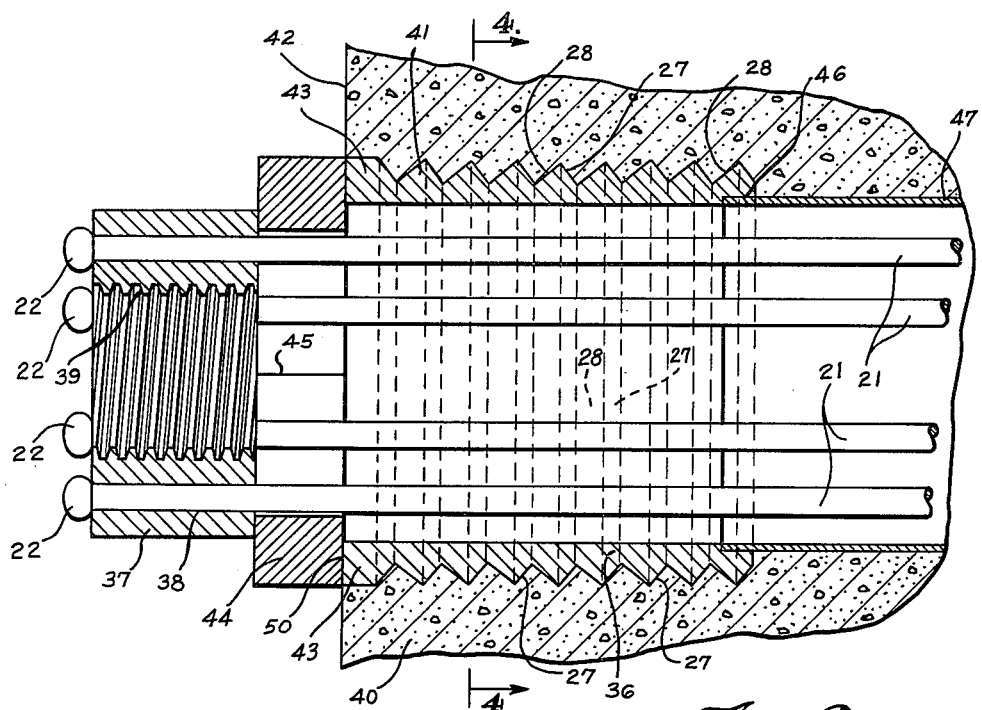
FIG. 3 is a longitudinal sectional view through an anchorage for a concrete structure in which a tubular bearing member of circular cross section, made in accordance with our invention, is utilized, a fragmentary portion of the concrete structure being shown.
Figure 4:
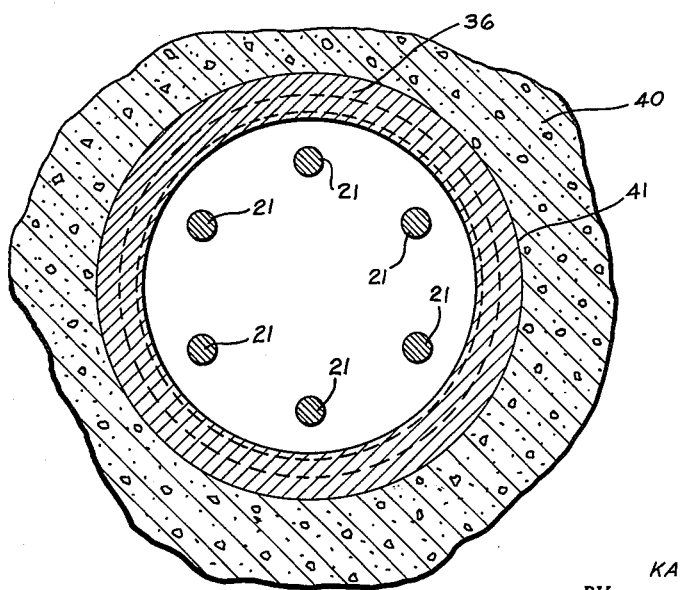
FIG. 4 is a section taken on the line 4—4 of FIG. 3.

In FIGS. 3 and 4 a tubular bearing member is shown, which has a body portion 36, which is circular in cross section, and through the opening in which extend the tension members 21, which may be of any desired number and arrangement. Said tension members are associated with an anchor member 37, which is of a circular character and slightly smaller than the opening through the body portion 36 so that it is free to move longitudinally therethrough. Said anchor member has openings 38 therein for the tension members 21, which are provided with the heads 22 for holding the same in engagement with the anchor member 37. An anchor member of this type is ordinarily provided with an internal thread 39 for attachment of pulling means thereto, such as a jack, for stressing the tension members 21. Said tubular bearing member is shown as being mounted in a body of concrete 40 and has the circular ribs 41 running around the same on the exterior thereof and arranged in parallel uniformly spaced relationship, said ribs having the inclined thrust distributing surfaces 27 and the connecting surfaces 28, and being of a generally V-shaped character in cross section, similar to that of the ribs 26 previously described, and serving the same purpose. Said inclined thrust distributing surfaces 27 cooperate to produce an area in the concrete body 40 under compression, that is of a conical character, widening away from the exposed end face 42 of the concrete structure 40. Said anchoring means 36 is provided with a thickened portion 43, which serves as means with which a split spacing ring 44 engages, said spacing ring being split on the line indicated at 45, and being adapted to be inserted in halves between the anchor member 37 and the bearing member 36 after the desired tension has been put on the tension members 21 and before disconnection of the pulling means therefrom. Also it is desirable to provide an annular recess at 46 in the inner face of the tubular bearing member 36 to receive a tubular sheath 47, which is normally provided to enclose the tension members 21 within the same to facilitate tensioning the same by avoiding the engagement of the concrete, as it is poured, therewith, the space within the sheath 47 and the bearing member 36 being filled with grout in the usual manner after the tension members 21 have been stressed. The function of sheath 47 to produce an open chase through the concrete may however be accomplished with other types of coring devices.

Figure 5:
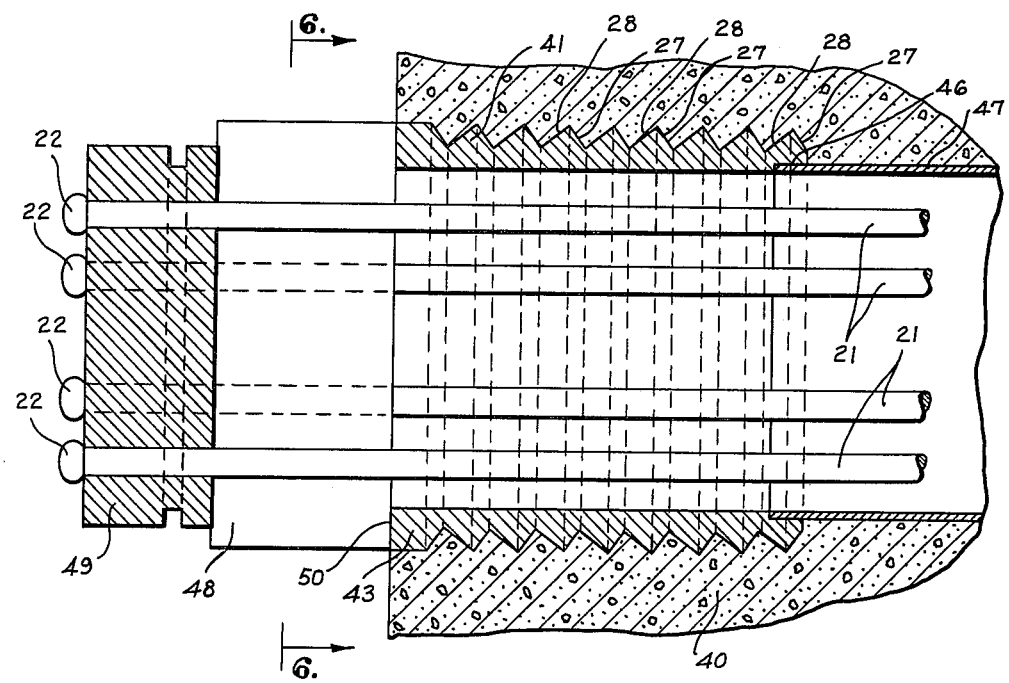
FIG. 5 is a view similar to FIG. 3, in which a slightly different form of anchorage is shown as being used with the tubular bearing member shown in FIG. 3.
Figure 6:
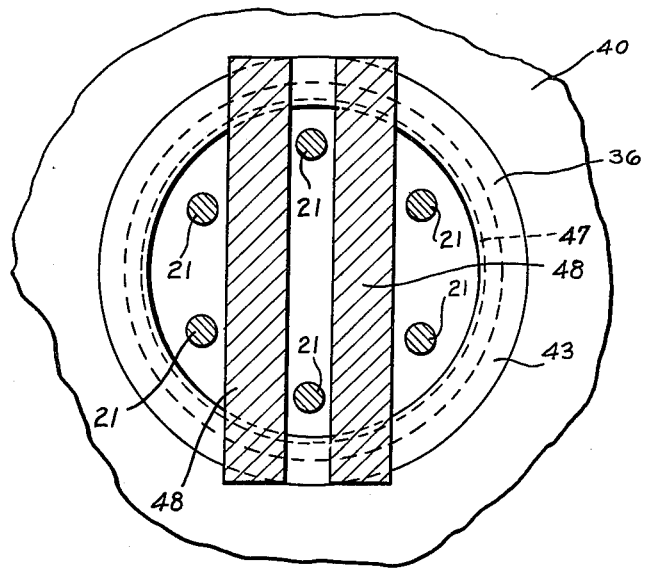
FIG. 6 is a section taken on the line 6—6 of FIG. 5.

Our improved bearing member, such as shown in FIGS. 3 and 4, is also adapted for use with the type of anchor member shown in FIG. 5 utilizing the shims shown in FIG. 6, the corresponding parts of the bearing member and the tension members having the same reference numerals applied thereto in FIGS. 5 and 6 as in FIGS. 3 and 4. The thickened wall portion 43 of said tubular anchor member 36 is engaged by the shims 48, which are placed between the tension members 21, as shown in FIG. 6, and between the thickened end wall 43 of the bearing member 36 and an anchor member 49 of special construction for use with a special type of coupling means for connecting the said anchor member with the pulling member for stressing the tension member. Said shims 48 bear against the flat end wall 50 of the thickened portion 43. The same is true, of course, of the split ring 44 when the anchorage is used that is shown in FIGS. 3 and 4.

Figure 7:
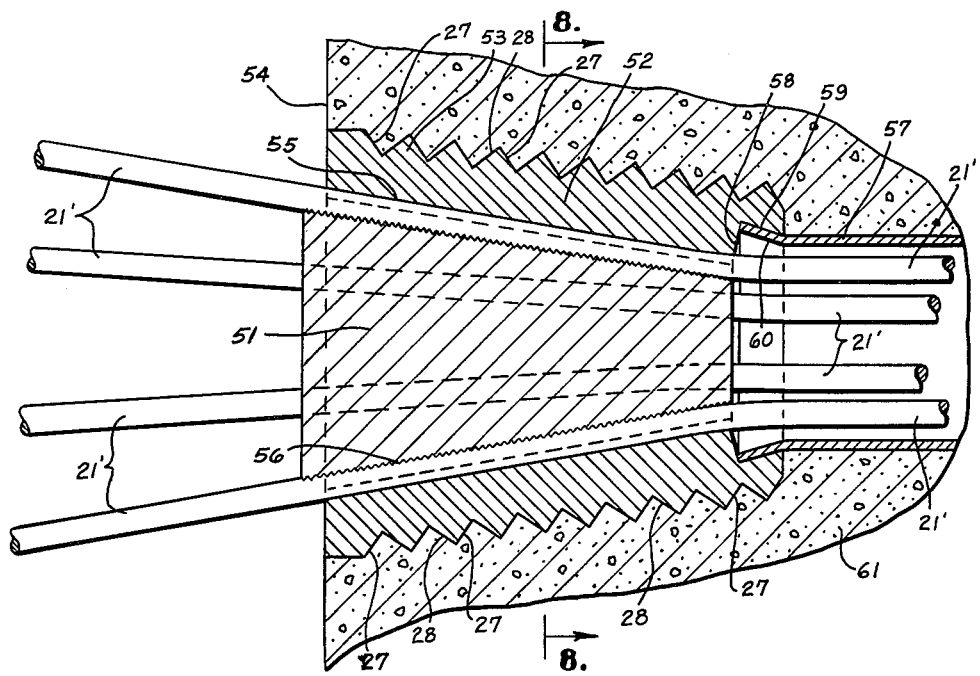
FIG. 7 is a view similar to FIG. 3 of an anchorage in which the tension members are clamped or held in position by wedging means.
Figure 8:
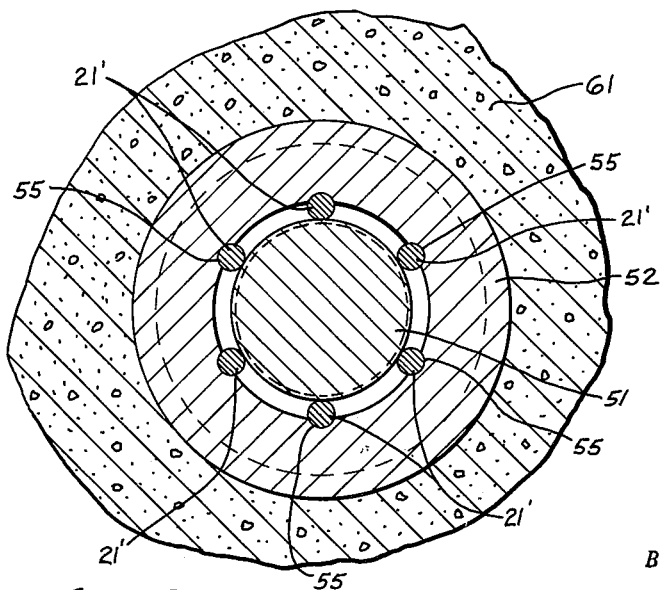
FIG. 8 is a section taken on the line 8—8 of FIG. 7.

In an anchorage in which the tension members 21', which frequently are of a stranded character, are held in position by the wedging action of a wedging member 51, which may be made of any suitable material, the bearing member shown in FIGS. 7 and 8 is utilized. Said bearing member 52 is embedded in the body of concrete 61 and is of a frusto-conical character, having an outer conical surface that is provided with the ribs 53, which are of the same cross section as the ribs 26 and 41, previously described, to provide the thrust distributing surfaces 27, which are connected by means of the faces 28, which are oppositely inclined to the faces 27, and which faces 27 act in the same manner as the faces 27 previously described for the ribs 26 and 41 to provide an area in depth of the concrete to which the compression created by the tension members is distributed. However, due to the tapered character of the cone-shaped body portion 52 of the bearing member, each of the faces 27 toward the inner end of the bearing member from the next adjacent one will apply the thrust to a smaller circular area of the concrete, but it will be obvious that as the distance through the concrete increases from such a face 27, said circular area will gradually widen so that in the case of the bearing 52 a cone-shaped area will be put under compression through the agency of the faces 27 of the bearing member widening inwardly into the concrete from the exposed end face 54 thereof. Preferably such a cone-shaped anchor member 52 is provided with a plurality of grooves 55 on the inner face thereof for reception of the tension members 21' for holding the same in spaced relation to each other and to provide a tighter grip thereon by the anchorage. Obviously either the member 51 or the member 52 can be grooved for this purpose. The wedging member 51 may also be provided with serrations 56 for increasing the grip of the wedge 51 on the tension members 21'. A sheath 57 is preferably provided for the same purpose as the sheath 47, previously described, and the cone-shaped bearing member 52 is preferably recessed as shown at 58 and provided with an undercut annular surface 59 for receiving the flared end 60 of the sheath 57.

Figure 12:
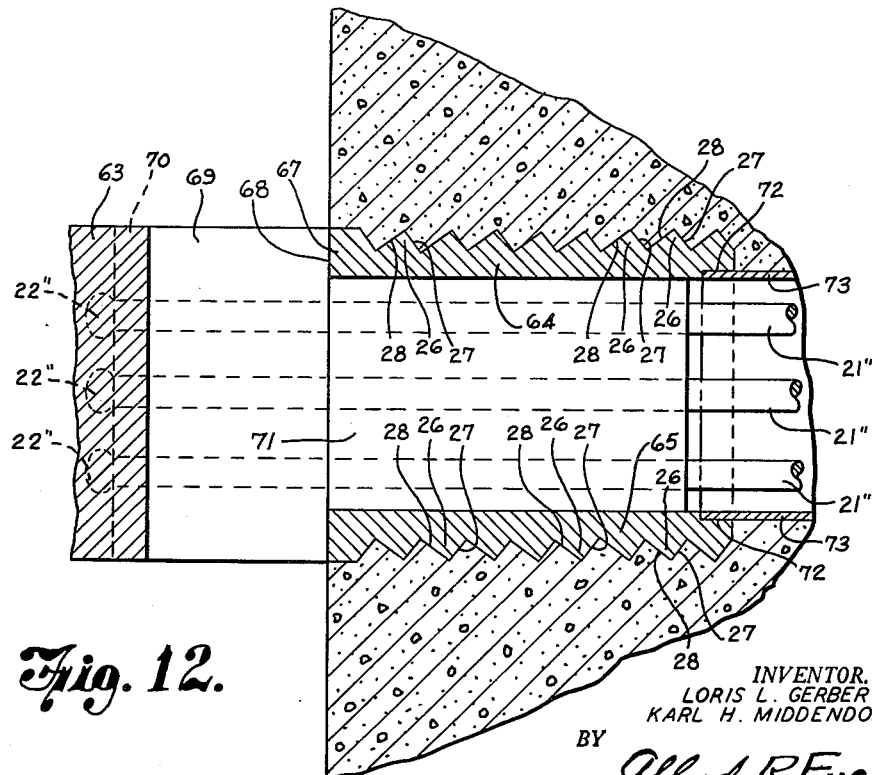
FIG. 12 is a section taken on the line 12—12 of FIG. 10, partly broken away.

Should the character and cross sectional shape of the concrete structural member that is prestressed require an arrangement of tension members in groups, such as shown in FIGS. 9 and 10, in which the tension members 21" are shown as being arranged in a plurality of parallel rows and as having heads 22" that are in engagement with the wall 62 of an anchor member 63, which is provided with suitable means for simultaneously pulling a plurality of said tension members 21" so as to put said tension members under the desired stress, a rectangular tubular bearing member, such as shown in FIGS. 9, 10 and 12, may be provided. Said bearing member is shown as having a top wall 64, a bottom wall 65, and end walls 66. Each of said walls 64, 65 and 66 is provided with a plurality of the ribs 26, which have the thrust distributing faces 27 thereon, and which are provided with faces 28 that connect the thrust distributing surfaces 27. Said ribs are arranged in parallelism and are all of the same cross sectional shape, and otherwise are substantially the same in character as those described in connection with the other forms of the invention. A thickened wall portion 67 is provided on each of the walls 64, 65 and 66, providing a flat bearing surface 68, shims being positioned between the wall 70 of the anchor member 63 and the said bearing member to hold the tension members 21" in their stressed condition.

In a rectangular bearing member such as that shown in FIGS. 9 and 10 it is desirable to provide cross members or connecting webs 71 therein between the opposite walls 64 and 65, which will brace the walls 64 and 65, resisting the inward thrust component induced by the action of the surfaces 27 of the ribs 26. Preferably said cross members are utilized as bearing portions for engagement by the shims 69, said shims being positioned in alignment with the webs 71.

Figure 11:
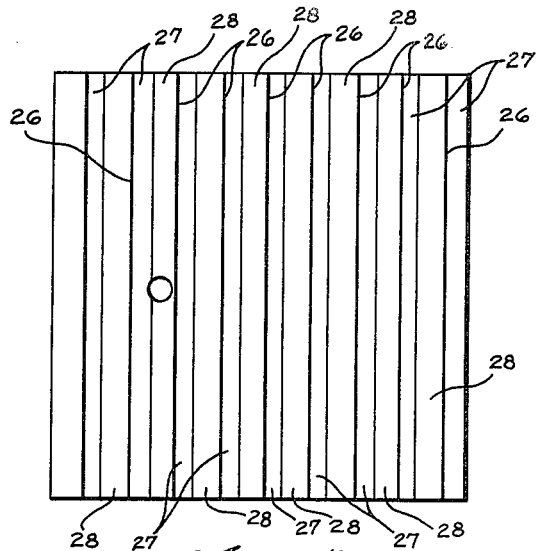
FIG. 11 is a top plan view of one of the plates shown in FIG. 1.

The walls 64, 65, 66 and web portions 71 are recessed as shown at 72 to receive the end edges of a sheath 73, which is preferably provided to enclose the tension members 21", provided for the same purpose as the sheaths 47 and 57. A rectangular bearing member, such as shown in FIGS. 9, 10 and 12, will distribute the thrust, in a similar manner to that previously described, by the upper and lower walls thereof, in the same pattern as do the plate-like members 25 shown in FIGS. 1, 2 and 11, while additional distribution of the load will be obtained in a similar pattern extending outwardly from the end walls 66 of said bearing member.

What we claim is:

1. In a post-tensioned prestressed concrete structure, the combination with tension members of anchoring means therefor comprising an anchor member connected with said tension members to transfer thrust from the stressed tension members to said anchor member, a tubular bearing member rectangular in cross section embedded in said concrete, said bearing member being elongated longitudinally of said tension members and said tension members extending therethrough, and means for exerting thrust against the outer end of said bearing member by said anchor member comprising spacing means between said anchor member and said bearing member, said bearing member having external side by side parallel ribs of uniform height V-shaped in cross section thereon extending transversely of the length of said tension members, said ribs having flat bearing faces on one side of each thereof directed toward the inner end of said bearing member and away from said tension members and all extending parallel to each other obliquely to the direction in which said tension members extend, said bearing faces providing uniformly spaced parallel thrust distributing surfaces on said bearing member adjacent longitudinally of said tension members, said ribs having flat connecting surfaces disposed substantially perpendicularly with respect to said bearing faces so that the bearing faces of adjacent ribs create compression zones in the concrete adjoining longitudinally of said tension members.

2. In a post-tensioned prestressed concrete structure, the combination with tension members of anchoring means therefor comprising an anchor bar connected with said tension members to transfer thrust from the stressed tension members to said anchor bar, a bearing member embedded in said concrete, said bearing member comprising a pair of parallel bearing plates secured together in embracing relation to said tension members, said plates being elongated longitudinally of said tension members, and means for exerting thrust against the outer edges of said plates by said anchor bar comprising spacing means between said anchor bar and said bearing member, each of said bearing plates having external side by side parallel ribs of uniform height V-shaped in cross section thereon extending transversely of the length of said tension members, said ribs having flat bearing faces on one side of each thereof directed toward the inner end of said bearing plates and away from said tension members and all extending parallel to each other obliquely to the direction in which said tension members extend, said bearing faces providing uniformly spaced parallel thrust distributing surfaces on said plate adjacent longitudinally of said tension members, said ribs having flat connecting surfaces disposed substantially perpendicularly with respect to said bearing faces so that the bearing faces of adjacent ribs create compression zones in the concrete adjoining longitudinally of said tension members.

3. In a post-tensioned prestressed concrete structure, the combination with tension members of anchoring means therefor comprising an anchor member connected with said tension members to transfer thrust from the stressed tension members to said anchor member, a tubular bearing member embedded in said concrete, said bearing member being elongated longitudinally of said tension members, and means for exerting thrust against the outer end of said bearing member by said anchor member comprising spacing means between said anchor member and said bearing member, said bearing member having external side by side parallel ribs of uniform height V-shaped in cross section thereon extending transversely of the length of said tension members, said ribs having conical bearing faces on one side of each thereof directed away from said tension members toward the inner end of said bearing member and all extending parallel to each other obliquely to the direction in which said tension members extend, said bearing faces providing uniformly spaced parallel thrust distributing surfaces on said bearing member adjacent longitudinally of said tension members, said ribs having conical connecting surfaces disposed substantially perpendicularly with respect to said bearing faces so that the bearing faces of adjacent ribs create compression zones in the concrete adjoining longitudinally of said tension members.

4. In a post-tensioned prestressed concrete structure, the combination with stressed tension members of anchoring means therefor comprising bearing means embedded in said concrete and extending longitudinally of said tension members in a position with the outer end thereof exposed, means for transferring the thrust exerted by said stressed tension members to said bearing means to exert thrust on said bearing means toward the inner end thereof, said bearing means having said tension members extending therethrough and having side by side, parallel transverse external ribs thereon V-shaped in cross section, said ribs having bearing faces on one side thereof extending obliquely to the direction in which said tension members extend, said bearing faces being directed toward the inner end of said bearing means and away from said tension members and all extending parallel to each other to provide uniformly spaced parallel thrust distributing surfaces on said bearing means adjacent longitudinally of said tension members.

5. In a post-tensioned prestressed concrete structure, the combination with stressed tension members of anchoring means therefor comprising paired bearing plates embedded in said concrete and extending longitudinally of said tension members on opposite sides thereof in a position with the outer ends thereof exposed, means for transferring the thrust exerted by said stressed tension members to said bearing plates to exert thrust on said bearing plates toward the inner ends thereof comprising an anchor member having openings therein through which said tension members extend, spacing means between said anchor member and the outer ends of said bearing plates, heads on said tension members larger than said openings engaging said anchor member on the side thereof remote from said bearing plates to exert thrust on said anchor member toward said bearing plates and through said spacing means on said bearing plates, said bearing plates each having external side by side, parallel, transverse ribs on the sides thereof remote from said tension members, said ribs being V-shaped in cross section and having bearing faces on one side thereof extending obliquely to the direction in which said tension members extend, said bearing faces being directed toward the inner ends of said plates and away from said tension members and all extending parallel to each other to provide uniformly spaced parallel thrust distributing surfaces on said plates adjacent longitudinally of said tension members.

6. In a post-tensioned prestressed concrete structure, the combination with stressed tension members of anchoring means therefor comprising tubular bearing means embedded in said concrete in a position with the outer end thereof exposed, said tension members extending longitudinally through said bearing means, means for transferring the thrust exerted by said stressed tension members to said bearing means to exert thrust on said bearing means toward the inner end thereof, said bearing means having side by side, parallel, transverse external ribs thereon V-shaped in cross section, said ribs having bearing faces on one side thereof extending obliquely to the direction in which said tension members extend, said bearing faces being directed toward the inner end of said bearing means and away from said tension members and all extending parallel to each other to provide uniformly spaced parallel thrust distributing surfaces on said bearing means adjacent longitudinally of said tension members.

7. In a post-tensioned prestressed concrete structure, the combination with stressed tension members of anchoring means therefor comprising tubular bearing means embedded in said concrete in a position with the outer end thereof exposed, said tension members extending longitudinally through said bearing means, means for transferring the thrust exerted by said stressed tension members to said bearing means to exert thrust on said bearing means toward the inner end thereof comprising an anchor member having openings therein through which said tension members extend, spacing means between said anchor member and the outer end of said bearing means, heads on said tension members larger than said openings engaging said anchor member on the side thereof remote from said bearing means to exert thrust on said anchor member toward said bearing means and through said spacing means on said bearing means, said bearing means having a conical outer surface having side by side, parallel, transverse ribs thereon V-shaped in cross section, said ribs having bearing faces on one side thereof extending obliquely to the direction in which said tension members extend, said bearing faces being directed toward the inner end of said bearing means and away from said tension members and all extending parallel to each other to provide uniformly spaced parallel thrust distributing surfaces on said bearing means adjacent longitudinally of said tension members.

8. In a post-tensioned prestressed concrete structure, the combination with stressed tension members of anchoring means therefor comprising tubular bearing means embedded in said concrete in a position with the outer end thereof exposed, said tension members extending longitudinally through said bearing means, means for transferring the thrust exerted by said stressed tension members to said bearing means to exert thrust on said bearing means toward the inner end thereof comprising an anchor member having openings therein through which said tension members extend, spacing means between said anchor member and the outer end of said bearing means, heads on said tension members larger than said openings engaging said anchor member on the side thereof remote from said bearing means to exert thrust on said anchor member toward said bearing means and through said spacing means on said bearing means, said bearing means having a cylindrical outer surface having side by side, parallel, transverse ribs thereon V-shaped in cross section, said ribs having bearing faces on one side thereof extending obliquely to the direction in which said tension members extend, said bearing faces being directed toward the inner end of said bearing means and away from said tension members and all extending parallel to each other to provide uniformly spaced parallel thrust distributing surfaces on said bearing means adjacent longitudinally of said tension members.

9. In a post-tensioned prestressed concrete structure, the combination with stressed tension members of anchoring means therefor comprising tubular bearing means rectangular in cross section embedded in said concrete in a position with the outer end thereof exposed, said tension members extending longitudinally through said bearing means, means for transferring the thrust exerted by said stressed tension members to said bearing means to exert thrust on said bearing means toward the inner end thereof, said bearing means being elongated lengthwise of said tension members and having external, side by side, parallel, transverse ribs thereon V-shaped in cross section, said ribs having bearing faces on one side thereof extending obliquely to the direction in which said tension members extend, said bearing faces being directed toward the inner end of said bearing means and away from said tension members and all extending parallel to each other to provide uniformly spaced parallel thrust distributing surfaces on said bearing means adjacent longitudinally of said tension members.

References Cited by the Examiner
UNITED STATES PATENTS

| | | | |
|---|---|---|---|
| 2,686,963 | 8/54 | Freyssinet | 50—135 X |
| 2,728,978 | 1/56 | Birkenmaier et al. | 50—135 X |
| 2,737,802 | 3/56 | Bakker | 50—137 X |
| 2,781,658 | 2/57 | Dobell | 50—128 |
| 2,963,273 | 12/60 | Lane | 50—128 X |
| 2,970,406 | 2/61 | Finsterwalder | 50—128 |

FOREIGN PATENTS

| | | |
|---|---|---|
| 163,172 | 1955 | Australia. |
| 699,325 | 11/53 | Great Britain. |
| 739,480 | 10/55 | Great Britain. |
| 775,744 | 5/57 | Great Britain. |
| 796,801 | 1958 | Great Britain. |
| 526,409 | 6/56 | Canada. |
| 83,103 | 1956 | Holland. |

HENRY C. SUTHERLAND, *Primary Examiner.*

WILLIAM I. MUSHAKE, JACOB L. NACKENOFF, BENJAMIN BENDETT, *Examiners.*